T. J. NASH.
HIGH PRESSURE STEAM COOKING UTENSIL.
APPLICATION FILED DEC. 18, 1912.
1,077,289.
Patented Nov. 4, 1913.
2 SHEETS—SHEET 1.
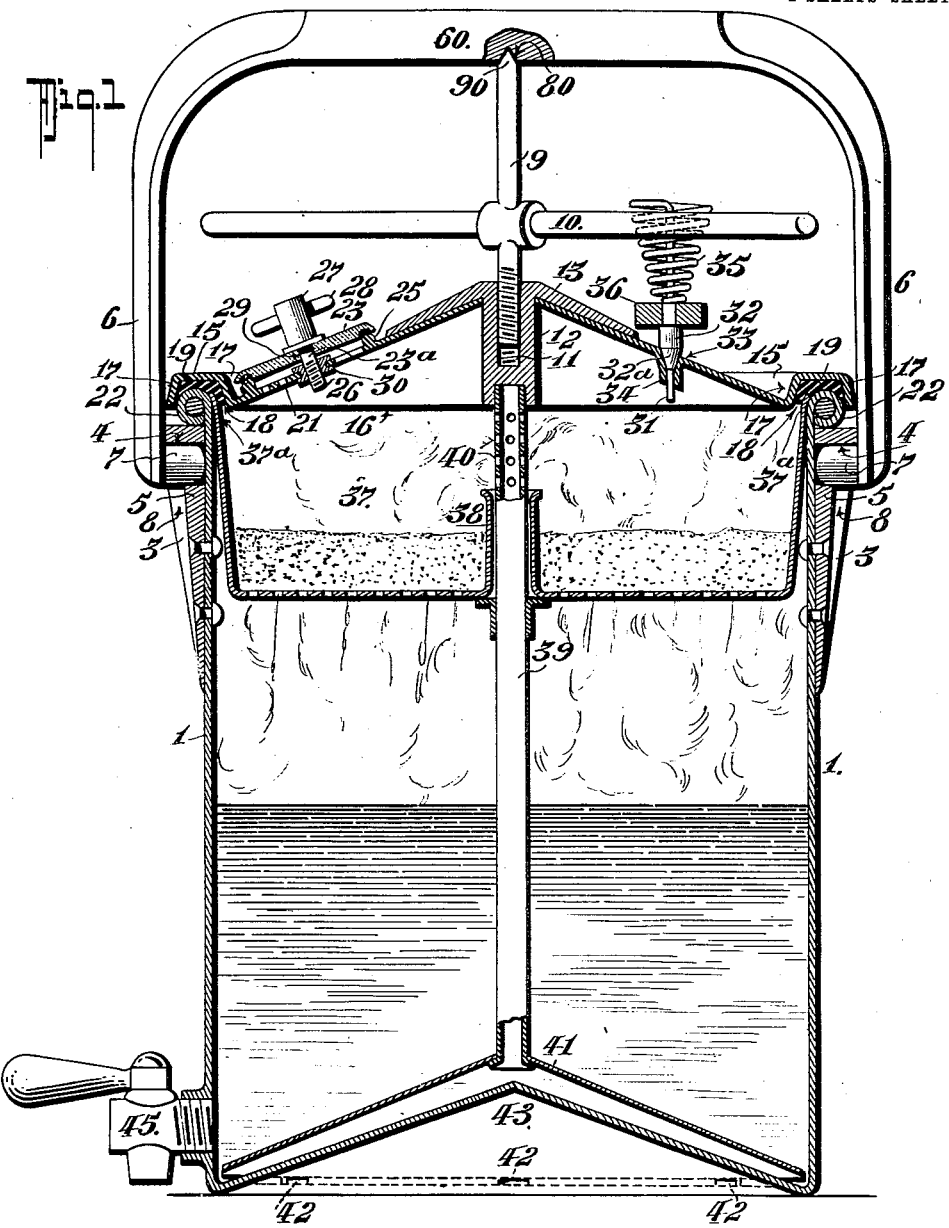

T. J. NASH.
HIGH PRESSURE STEAM COOKING UTENSIL.
APPLICATION FILED DEC. 18, 1912.
1,077,289.
Patented Nov. 4, 1913.
2 SHEETS—SHEET 2.
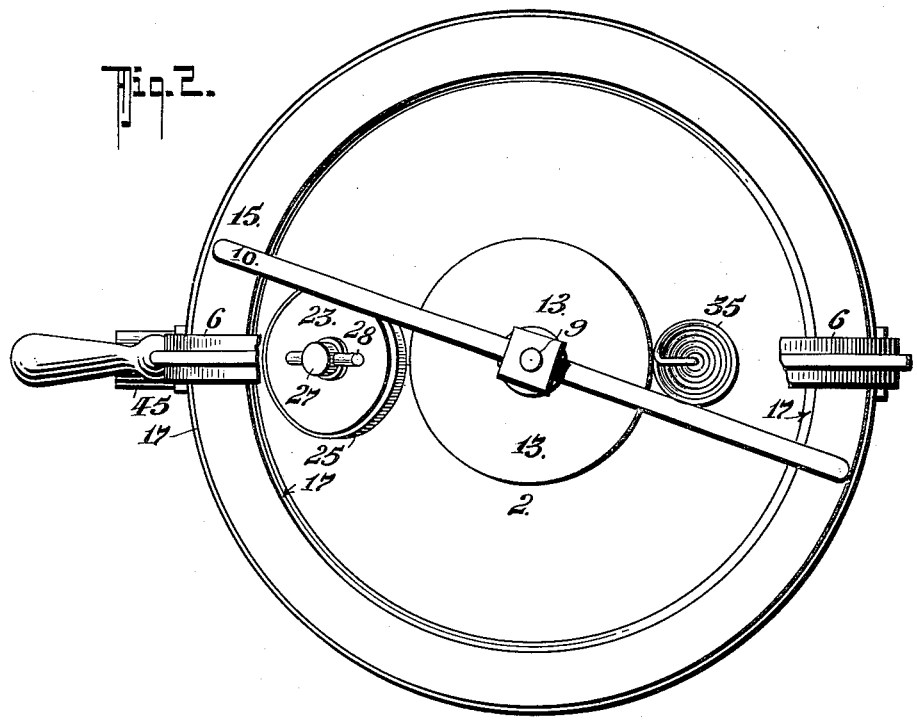
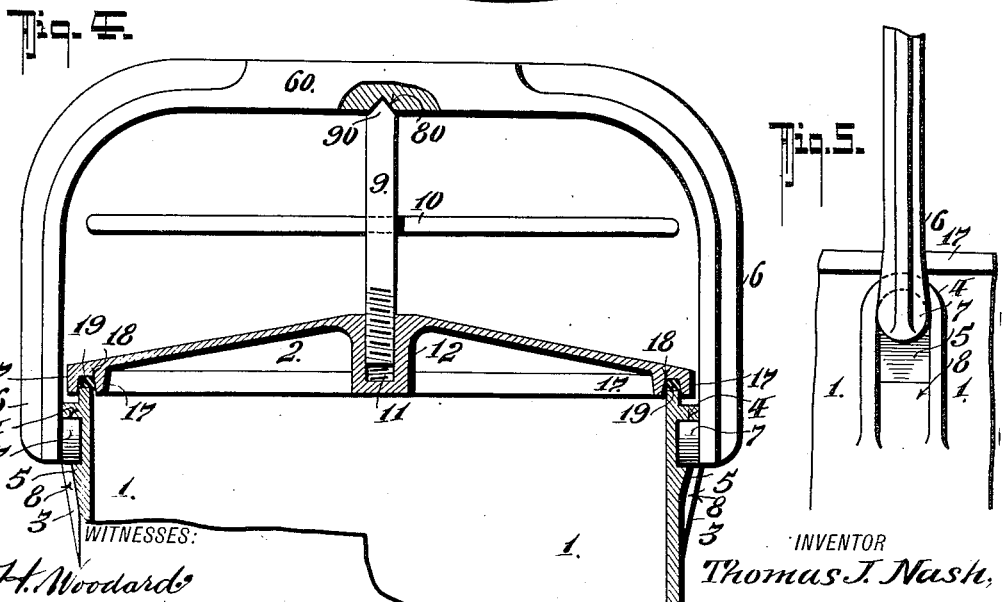

UNITED STATES PATENT OFFICE.

THOMAS J. NASH, OF LINCOLN, NEBRASKA.

HIGH-PRESSURE STEAM-COOKING UTENSIL.

1,077,289.

Specification of Letters Patent. Patented Nov. 4, 1913.

Application filed December 18, 1912. Serial No. 737,427.

*To all whom it may concern:*

Be it known that I, THOMAS J. NASH, residing at Lincoln, in the county of Lancaster and State of Nebraska, have invented an Improved High-Pressure Steam-Cooking Utensil, of which the following is a specification.

My invention, which in its generic nature has for its object the provision of an improved high pressure combined water and steam cooker, and utilized either as a coffee cooker or as a cooking vessel for general use, more particularly has reference to an improved means for closing and tightly sealing the vessel or container to adapt it for quicker cooking of all foods, under minimum expense of fuel, and for preserving practically all of the aromatic portions that are usually lost in cooking in the ordinary types of cookers.

Another object of my invention is to provide a utensil of the general character stated, of a simple and economical construction, in which the coöperative parts are so arranged and combined that they may be readily assembled for use and handling, which effectively serves the intended purposes, and by the use of which an absolutely safe sealing or closure of the container, and retaining of the steam and aroma, especially in making coffee, is provided for.

With the above and other objects in view, that will hereinafter appear, my invention comprehends a cooking utensil embodying the novel arrangement and peculiar construction of parts explained in the following specification—specifically pointed out in the appended claims, and illustrated in the accompanying drawings, in which:

Figure 1 is a vertical section of my cooking utensil, the same being shown as especially adapted for cooking coffee, the parts being in an operative position. Fig. 2 is a top plan view, parts of the handle being broken away. Fig. 3 is a detail perspective view, parts being in section, of the draining opening in the cover, and the cover devices therefor, hereinafter explained. Fig. 4 is a vertical section of the upper end of a cooking utensil embodying my invention and illustrating a slightly modified form thereof. Fig. 5 is an end view of the bail or handle part of the vessel, and illustrates one of the bail and body connections.

In the practical application of my invention, the main body portion or container 1 may be of any suitable size or form, and of any material suitable for the purposes for which the vessel or container may be used. 2 designates a cover also of any desired or suitable material.

The upper edge of the body 1 is rounded, and when of sheet metal the said edge is beaded as at 22. At diametrically opposite sides the vessel body is provided with loop like hangers 3, which, when the vessel is of sheet metal are separate members riveted or otherwise made fast to the body and when the body is of cast metal they are preferably formed integral with the said body as clearly shown in Figs. 4 and 5. The upper ends of the hangers are in the nature of sockets 4 the lower edges of which form the terminals of vertically extended wedge portions 5, the tops of the latter forming the bottom edge of the sockets.

6 designates a bail or handle the terminals of which have journals 7, for riding up in the guideways 8 of the loops 3—and slipping over the wedge portions 5 and dropping into the sockets 4—such arrangement of parts providing a simple and efficient means for connecting the handle bails 6 to the pot. The opposite ends of the bail 6 are parallel, whereby, when the bail is at its swing up position, the crown or handle portion 60 proper will be some height above the top of the pot, the reason for which will presently appear.

The end portions of the bail are of T shape in cross section, to add strength, while the portion 60 is rectangular with round edges for convenient handling. Centrally, and in the underside the handle 60 has a conical seat 80—for receiving the upper conical end 90 of a clamping screw rod 9, that carries a cross bar 10 for operating it. The lower threaded end of rod 9 engages a screw socket 11 in a pendent hub 12 of a casting 13 riveted or otherwise made fast on the apex of the cone-shaped cover 2, when such cover is made of sheet metal as in Figs. 1 and 2. The said hub 12 is integral with the said cover when the latter is of cast metal as in Fig. 4. The lower end of the rod 9 has left hand threads so that when the screw is turned, clockwise, by its cross bar, a downward force is applied to the cover 2, it being understood that the screw socket in the hub 12 is of such depth that when the screw rod is screwed down to the limit in the said socket the upper end of the rod 9 is low enough to allow the handle 6 to clear or swing over it.

The cover 2 when made of sheet metal is preferably formed with an annular flange 15 in a plane above the lower edge 16 of the cover or top, the said flange including pendent diverging side portions 17—17 that form an annular tapering groove 18, narrowest at the top, and for resting over the upper edge of the body of the vessel as best shown in Fig. 1, by reference to which it will be also noticed that by reason of having the flange 15 in a plane above the bottom edge of the cover 2 the inner side portion 17 extends down over the inner side of the upper edge or rim of the pot or vessel.

19 denotes a gasket of any suitable material that is tightly wedged in the groove 18.

By reason of the construction of the parts so described and shown it is apparent that by turning the screw rod 9 to exert pressure on the cover 2 a positively steam tight closure is effected at the rim and flange connections of the cover and the vessel 1.

Cover 2 is provided with a drain or sight opening 20, one portion of which is closed by a perforated bottom 21, while the other or open portion forms an inlet, through which water or other liquids may be added to the main cooking contents, without raising the main cover 2. The said opening 20 is normally closed by a cover 23, having a gasket receiving groove 24 for coöperating with the annular flange 25. Cover 23 may be glass, metal, or other suitable material, and is held securely in place by clamp screw rod 26 on the end of a hub 27 having handle 28. Screw 26 passes through a tapped hole 29 in the cover 23 and just next the collar portion 23ª of the hub, the threads on the rod 26 are omitted, so that the rod may turn freely in the cover 23 and yet be held from easy detachment from the said cover. The screw 26 engages a threaded boss 30 in the cover 2. The hub 27 may be tapped and threaded and screwed on the rod 26. Cover 2 is also provided with a safety valve device, which in my arrangement is detachably connected to the said cover.

The valve comprises a long flat stem 31 and an enlarged round stem 32 that terminates at its juncture with the stem 31 in a valve 32ª for engaging a valve seat 33 formed on the upper end of the long aperture 34 in the cover 2 that receives the stem 31. The safety valve device also includes a coiled spring handle 35 to avoid burning hands when removing the device. This handle 35 is made long enough, so that when valve is in use it projects perpendicularly in the path of the sweep of the bar 10, and thereby necessitates the removal of the said valve to allow the steam to escape before the bar 10 can be turned to loosen the cover 2. The safety valve is also provided with a weight 36 which may be of any desired size to retain the steam to a predetermined pressure, it being understood that excess pressure in the vessel causes the weighted valve to rise and the excess pressure to blow off.

When my invention is arranged for cooking coffee it is fitted with a removable tray 37, preferably stamped up from sheet metal, its bottom perforated and its upper edge turned out to form a flange 37ª for resting on the upper run edge of the vessel body 1. This tray with the perforated bottom is removed and a tray with a closed bottom is used when the cooker is for purposes other than cooking coffee. Tray 37 includes a vertically extended central tube 38 which slidably engages another central tube 39, the upper end of which seats on and is closed by the socket in the lower end of the pendent hub 12 and the said end above the tube 38 is perforated as shown at 40. The tube 39 carries a member 39ˣ on which the tray 37 may rest, the member 39ˣ serving to close the passage through the tube 38 to prevent the escape of steam through the same if desired.

41 is a cone-shaped bottom—the under face of which has a plurality of lug flanges 42 that seat on the cone shaped bottom 43 of the utensil 1 and separate the two bodies to allow a free circulation of the water and steam under the bottom 41 and to pass upward through the tube 39 to which the bottom 41 is connected.

45 designates a drawing off outlet and a hand valve therefor.

When the pot 2 and the cover are of cast metal, the cover flange is made as shown in Fig. 4, and in this form the lower edge of the cover is in the nature of an internal flange 46 that projects down beyond the flat rim edge of the vessels.

When used as a coffee cooker the ground coffee is placed within the tray having the perforated bottom, the same acting as a percolator. As the steam is created it is forced up through the central tube and discharges mixed water and steam through the upper perforated end upon the coffee—then filters through the coffee and drops through the perforated bottom, and since the bottom 41 flares upward at a sharper angle than does the bottom 43—the water is caused to continuously circulate up the central tube, and further, since the said bottom 41 covers the entire bottom surface of the cooker, it prevents the coffee above it from boiling. Again the cone shaped bottom 43 of the cooker deflects the heat toward center, holding the excessive heat there and boiling with less fire, and at the same time utilizing the fire most efficiently. The cooker retains all the steam to a predetermined pressure, thereby saves the heat, forces the steam and hot water into the coffee, softening it, and removes the strength and essence more quickly than is usually done and saves, by condensation, practically all the aroma and flavor that would otherwise pass off with the steam and be lost.

While I have described my cooker as especially well adapted for cooking coffee, I desire it understood that its use is not thus limited, since it can be readily applied with modifications that come within the scope of the appended claims, for cooking meats, vegetables, etc.

What I claim is:

1. An improved cooking utensil comprising a pot-like body, a cover removably mountable on the top edge of the said body, a bail shaped handle whose ends pivotally connect with the body to swing over the cover, the said handle including a bearing portion that is disposed centrally over the cover when the handle is swung up to its carrying position, a presser screw which includes a horizontally extended handle, the said screw being adapted for engaging the cover and the bearing in the bail shaped handle, whereby when the said screw handle is swung around pressure is applied to the cover, a safety valve removably mounted on the cover, said valve including a vertical extension that projects into the plane of the sweep of the handle of the presser screw.

2. An improved means for clamping a cover steam-tight on a cooking utensil, said means comprising a central hub on the cover having an internally threaded socket, a screw shank that engages the said socket, the said shank having a horizontal sweep arm, a bail like handle whose ends are pivotally connected to the utensil, the said utensil having socket bearings on the sides thereof for receiving the ends of the handle bail, the said bearings including wedge members that lead to and form the lower edges of the socket bearings.

3. In a cooking utensil, a kettle, a tray removably supported within the upper edge of the kettle and having a centrally upwardly extended tube, a false bottom mountable upon the bottom of the kettle and having members for holding it spaced from the said bottom of the kettle, a tube extending from the said false bottom up through the tube in the tray and having its upper end perforated to discharge into the tray, a cover, said cover including a pendent hub having a socket for engaging the upper end of the perforated tube, the said cover including an annular flange having a packing receiving groove adapted for engaging the upper edge of the kettle and the tray suspended therein, and means for clamping the cover under pressure upon the kettle.

THOMAS J. NASH.

Witnesses:
 Leo J. Schmittel,
 H. C. Wilcoxen.